US007969059B2

(12) United States Patent
Cacal et al.

(10) Patent No.: US 7,969,059 B2
(45) Date of Patent: Jun. 28, 2011

(54) BRUSH ASSEMBLY HAVING A BRUSH WEAR DETECTOR AND INDICATOR FOR A D.C. MOTOR

(75) Inventors: Charito J. Cacal, Chicago, IL (US); Timothy M. Oliver, Green Oaks, IL (US); Joseph J. Norris, Downers Grove, IL (US)

(73) Assignee: Bodine Electric Company, Chicago, IL (US)

( * ) Notice: Subject to any disclaimer, the term of this patent is extended or adjusted under 35 U.S.C. 154(b) by 273 days.

(21) Appl. No.: 12/390,137

(22) Filed: Feb. 20, 2009

(65) Prior Publication Data

US 2009/0206695 A1 Aug. 20, 2009

Related U.S. Application Data

(60) Provisional application No. 61/030,120, filed on Feb. 20, 2008.

(51) Int. Cl.
*H02K 13/00* (2006.01)
*H02K 11/00* (2006.01)
*H02K 23/66* (2006.01)

(52) U.S. Cl. ........................ 310/239; 310/68 B; 340/648

(58) Field of Classification Search .................. 310/239, 310/242, 248, 249, 68 B; 340/635, 648, 340/679, 686.3, 686.4; 702/34; *H02K 13/00, H02K 11/00, 23/66*
See application file for complete search history.

(56) References Cited

U.S. PATENT DOCUMENTS

| | | | | |
|---|---|---|---|---|
| 4,739,208 | A * | 4/1988 | Kimberlin | 310/242 |
| 4,761,594 | A * | 8/1988 | Rodi et al. | 318/490 |
| 4,918,348 | A * | 4/1990 | Fitzsimmons et al. | 310/242 |
| 4,950,933 | A | 8/1990 | Pipkin et al. | |
| 5,731,650 | A | 3/1998 | Scheucher | |
| 5,753,995 | A * | 5/1998 | Ogino | 310/242 |
| 5,870,026 | A * | 2/1999 | Challenger | 340/648 |
| 6,111,643 | A * | 8/2000 | Discenzo et al. | 356/450 |
| 6,255,955 | B1 | 7/2001 | Blaettner | |
| 6,359,690 | B1 * | 3/2002 | Discenzo et al. | 356/450 |
| 6,731,042 | B1 * | 5/2004 | Bank et al. | 310/239 |
| 6,803,685 | B2 * | 10/2004 | Ikawa et al. | 310/68 B |
| 6,933,650 | B2 * | 8/2005 | Wang | 310/245 |
| 2003/0107292 | A1 * | 6/2003 | Kashihara et al. | 310/239 |
| 2007/0029893 | A1 * | 2/2007 | Schuler et al. | 310/239 |
| 2007/0294007 | A1 * | 12/2007 | Katrak | 701/41 |

FOREIGN PATENT DOCUMENTS

| | | | | |
|---|---|---|---|---|
| FR | 2613546 | A1 * | 10/1988 | |
| JP | 06014501 | A * | 1/1994 | |

OTHER PUBLICATIONS

FR 2613546 A1 Translation, http://ep.espacenet.com/.*
JP 06014501 A Translation, http://dossier.ipdl.inpit.go.jp/text_trans.html.*

* cited by examiner

*Primary Examiner* — Quyen Leung
*Assistant Examiner* — Thomas Truong
(74) *Attorney, Agent, or Firm* — McAndrews, Held & Malloy, Ltd.

(57) ABSTRACT

A brush assembly having a brush wear indicator for use with electric actuating devices such as motors and generators that detects the worn condition of a brush and generates a signal indicating this worn condition.

3 Claims, 5 Drawing Sheets

FIG.3
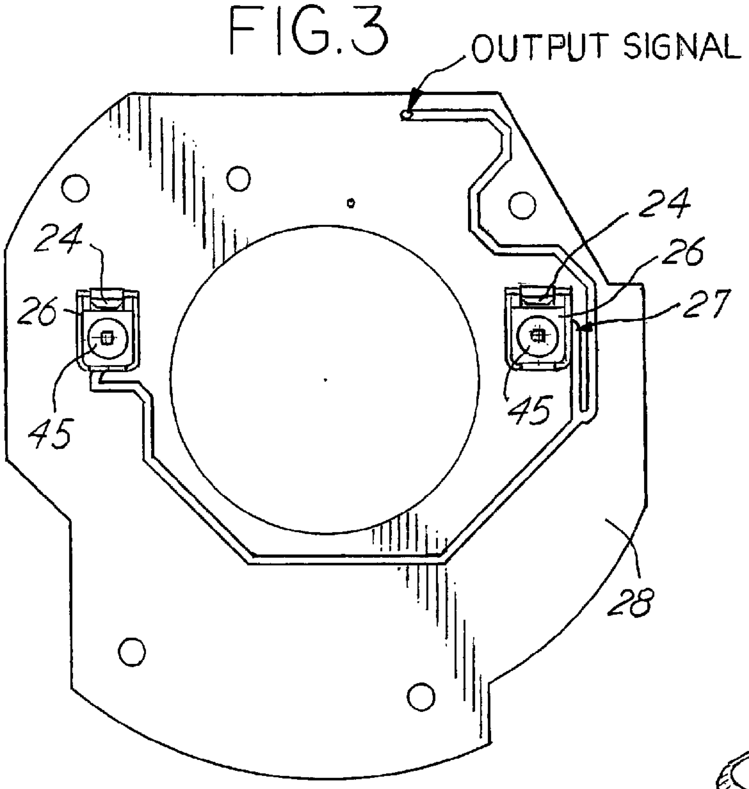
FIG.4
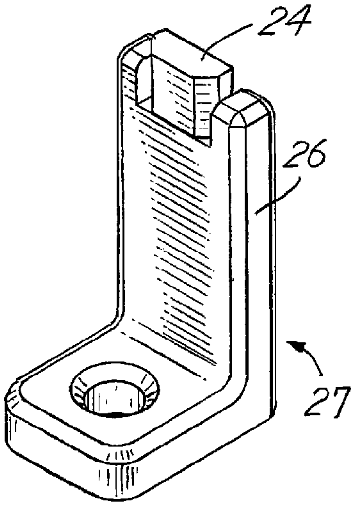
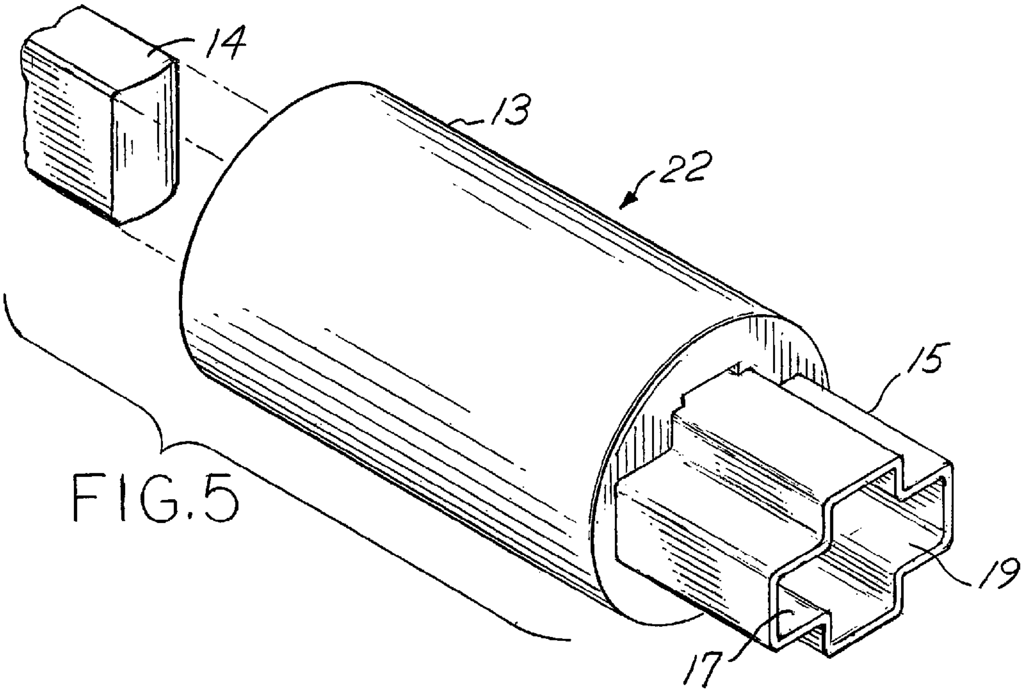
FIG.5

BRUSH ASSEMBLY HAVING A BRUSH WEAR DETECTOR AND INDICATOR FOR A D.C. MOTOR

RELATED APPLICATIONS

[Not Applicable]

FEDERALLY SPONSORED RESEARCH OR DEVELOPMENT

[Not Applicable]

FIELD OF THE INVENTION

The present invention relates to a brush assembly having a brush wear detector and indicator for use with an electric actuating device such as a D.C. motor or generator, and more particularly, relates to a brush wear detector which generates an electrical signal indicating a worn condition of a brush.

BACKGROUND OF THE INVENTION

Electric actuating devices, such as rotating or linear moving electric apparatus, dynamos, motors, generators, etc., typically include a moving commutator. The commutator is electrically coupled to an external electric circuit through one or more brushes which make physical contact with the commutator. As the commutator moves against the brush, the contact surface of the brush wears down to a point where replacement of the brush is required.

Brush wear detectors are known in the art and generally comprise various types of mechanical and electrical arrangements which act to signal the fact that the brush has worn away to a point at which replacement is required. Known detectors may comprise electrical leads inserted into the brush which signal that the brush is worn. An example of such an apparatus is shown and described in U.S. Pat. No. 5,870,026, entitled "Brush Wear Indicator," which issued to Keith C. Challenger on Feb. 9, 1999. Detectors that utilize electrical leads inserted into the brush not only increase the cost and complexity of the detector system, but may also cause metal-on-metal structural damage if the brushes are not replaced and the leads contact the commutator for an extended period of time.

Another example of a brush wear detector is one in which a magnet moves towards the commutator as the brush wears down and activates a reed switch at a point when the brush needs to be replaced. An example of such an apparatus is shown and described in U.S. Pat. No. 4,739,208, entitled "Brush Assembly Including Brush Wear Detector," which issued to Dan W. Kimberlin on Apr. 19, 1988. Reed switches, however, are mechanical devices and are susceptible to shock and vibration which may be encountered in electric actuating devices.

Other examples of brush wear detectors are those which depend on physical contact between metallic components of the brush assembly to complete an electrical circuit. Examples of such an apparatus are shown and described in: U.S. Pat. No. 6,255,955, entitled "Brush Warning Indicator and Methods For Indicating Brush Wear-Out," which issued to Harald Edmund Blaettner on Jul. 3, 2001; U.S. Pat. No. 5,731,650, entitled "Dynamoelectric Machine With Brush Wear Sensor," which issued to Walfried F. Scheucher on Mar. 24, 1998; and U.S. Pat. No. 4,950,933, entitled "Carbon Brush Holder utilizing a Worn Brush Detector," which issued to James R. Pipkin et al. on Aug. 21, 1990. Such detectors are not only costly and complicated, but are susceptible to unreliability if the contact parts become corroded or are fouled by foreign particulates such as dust from worn brushes.

Therefore, it is an object of the present invention to provide an improved brush wear detector that does not depend on physical contact between metallic components of the brush assembly.

BRIEF SUMMARY OF THE INVENTION

This and other objects of the present invention are achieved in an improved apparatus for detecting the worn condition of brushes in electric actuating devices. The apparatus includes a magnet that is moved as the brush is worn. A Hall-effect device mounted adjacent to the path of travel of the magnet generates a signal at a particular point along its path indicating that the brush is worn to a percentage of its length. In one embodiment, the magnet is attached to the brush by means of a bracket. The magnet translates in the same direction that the brush moves as the brush wears.

The magnet and brush may be contained in a brush holder that encloses the magnet along its path of travel. A Hall-effect device is positioned adjacent to the brush holder such that when the magnetic field produced by the moving magnet is of sufficient strength to exceed the operative point threshold of the Hall-effect device (preferably when the magnet is aligned with the sensor of the Hall-effect device), the device generates a signal indicating that the brush has worn to a percentage of initial length.

BRIEF DESCRIPTION OF SEVERAL VIEWS OF THE DRAWINGS

FIG. 3 is a top planar view of a printed circuit board of the apparatus of FIG. 1.

FIG. 4 is an isometric perspective view of a Hall effect device assembly of the apparatus of FIG. 1.

FIG. 5 is a perspective view of a brush assembly holder and a brush, of the apparatus of FIG. 1.

DETAILED DESCRIPTION OF THE PREFERRED EMBODIMENTS

Figure 1:
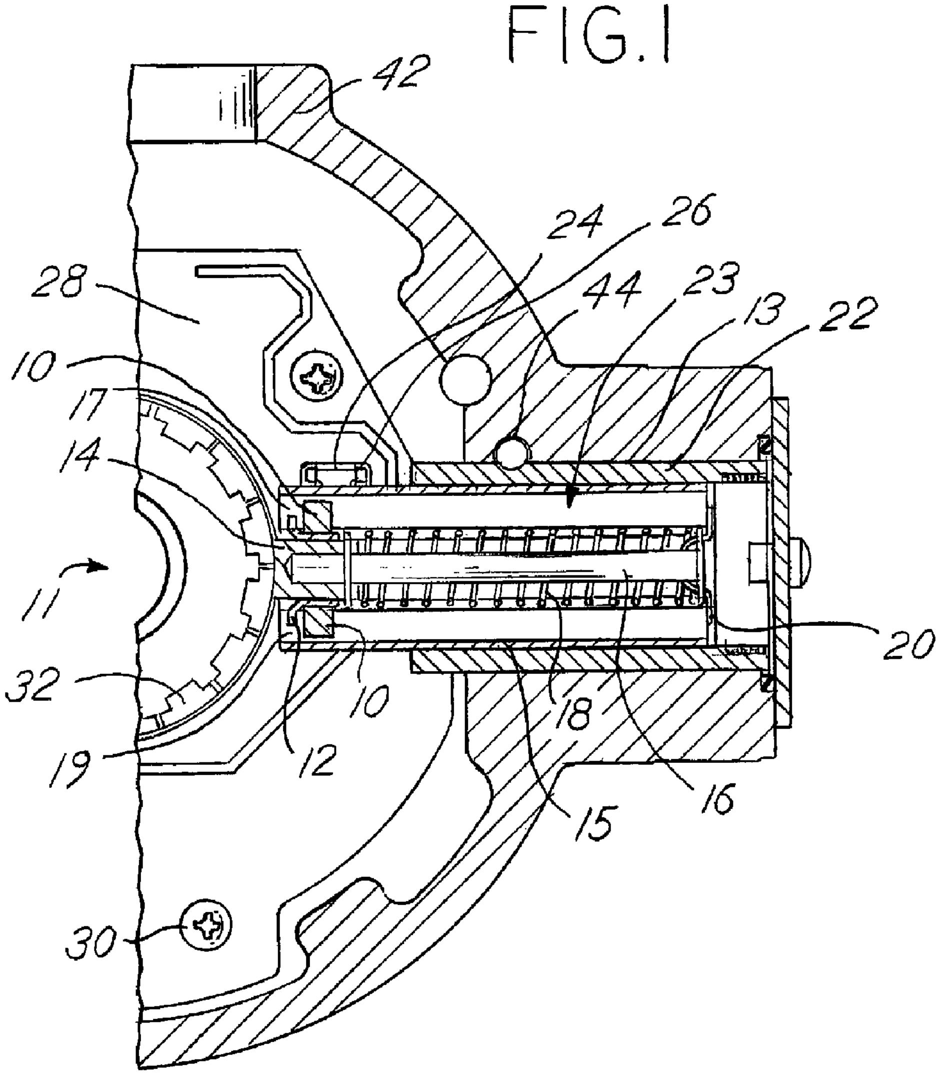
FIG. 1 is a schematic cross sectional top view of the right portion of the electrical input end of a D.C. motor having a brush wear detector apparatus according to the present invention.

Referring to FIG. 1, a D.C. motor 11 includes a rotatable commutator 32 against which a brush 14 is forced. Brush 14 is one component of a brush assembly 23 which is contained within a brush assembly holder 22. Brush 14 slides within holder 22 and toward commutator 32 as the brush wears away due to its physical contact with the rotating commutator.

Referring to FIGS. 1 and 5, brush holder 22 includes a cylindrical sleeve 13 which carries an inner tube 15. Sleeve 13 is securely mounted to the housing of motor 11 so as to align tube 15 with commutator 32. Tube 15 is made of an electrically conductive non-magnetic material (for example, brass) and is encapsulated by an insulating material.

As shown in FIG. 1, brush assembly 23 is retained in brush holder 22. Brush holder 22 is secured to a shield 42 of the motor by a fastener 44, such as a set screw.

As shown in FIG. 5, the cross-sectional shape of tube 15 is cross-shaped and is of the type shown in U.S. Pat. No. 6,731, 042, issued May 4, 2004, which is incorporated herein by reference. A pair of side relief channels 17, 19 of tube 15 are disposed along the two sides of brush holder 22. Relief channels 17, 19 house a pair of magnets 10 (FIG. 1) mounted opposite to one another. Magnets 10 are thus enclosed within tube 15 as the magnets move along a pathway defined by relief channels 17, 19. As will suggest itself, brush holder 22 may have cross-sectional shapes different than a cross shape.

Figure 2:
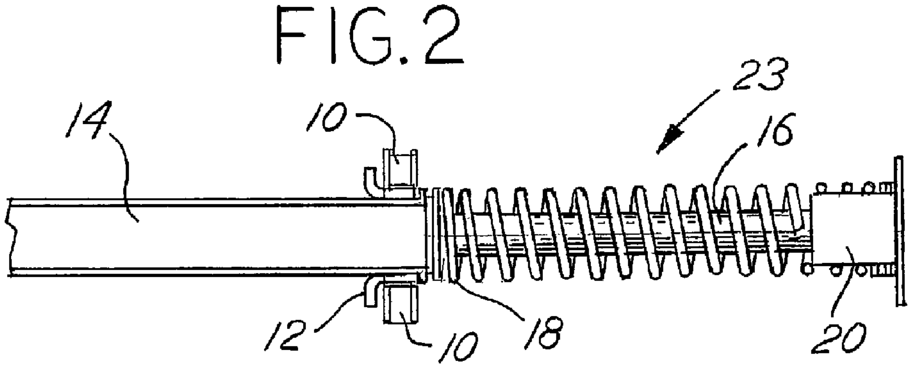
FIG. 2 is a top planar view of a brush assembly of the apparatus of FIG. 1.

Referring now to FIG. 2, brush assembly 23 includes carbon brush 14 which is attached to one end of a flexible shunt wire 16. A spring 18 is coiled around shunt wire 16, and serves to force brush 14 outwardly from holder 22 (FIG. 1) and against commutator 32 (FIG. 1). A terminal 20 is soldered to the other end of shunt wire 16.

As shown in FIG. 2, a bracket 12 is shaped to conform to the shape of brush 14, and is made of a material such as aluminum or high temperature resistant plastic that will allow for a bond between bracket 12 and magnets 10. Alternatively, magnets 10 may be adhered directly to brush 14 by a suitable adhesive, as for example, a Permabond brand cyanoacrylate. Instead of using an adhesive to attach magnet 10 to bracket 12 (or to the brush itself), a mechanical method of attachment may be used, such as screws or rivets. Alternatively, magnets 10 may be molded or pressed directly into brush 14 negating the need for an adhesive or mechanical fastener. The leading edge of the bracket 12, proximate to commutator 32, is bent away from brush 14, as shown. In the event that one or both of magnets 10 come loose from the bracket, the bent edge prevents the magnets from exiting tube 15 and contacting and damaging commutator 32 (or other moving parts) by containing magnets 10 inside of tube 15.

Bracket 12 pilots off the hub on brush 14 and is held in place by the force of spring 18. The hub serves as a locating pilot for spring 18 and a retainer for shunt wire 16. Spring 18 is a helical coil compression spring and is made of a stainless steel to increase its resistivity to current flow. Shunt wire 16 may be manufactured to allow for maximum flexibility which prevents brush 14 from binding within holder 22 when brush assembly 23 is compressed during installation. The fit of the terminal 20 in brush holder 22 facilitates assembly.

In one embodiment, two magnets 10 are used so as to eliminate the need to orient brush assembly 23 prior to installation into brush holder 22. Two-pole rectangular, square, or circular permanent magnets 10 are adhered to either side of bracket 12 and are made of rare earth materials for increased magnetic field strength.

As shown in FIGS. 3 and 4, a Hall-effect device assembly 27 is soldered to a printed circuit board 28 that is attached to end shield 42 (FIG. 1) by screws 30. The Hall-effect device assembly 27 is secured to printed circuit board 28 by a fastener 45, such as a plastic rivet. As will suggest itself, other circuitry to perform other tasks may be provided onto printed circuit board 28, and make use of power provided to the board.

As shown in FIG. 4, Hall-effect device assembly 27 includes a Hall-effect device 24 and a housing 26. Housing 26 is made of a high temperature non-conductive material such as plastic. Hall-effect device 24 may be protected from brush dust or other harmful foreign materials, if desired. For example, potting compounds, conformal coatings or housing structures may be used. Housing 26 establishes the proper height relationship between the Hall-effect device 24 and magnets 10.

As brush 14 wears, spring 18 pushes bracket 12 and magnets 10 along tube 15 toward commutator 32. Hall-effect device 24 is positioned adjacent to the path of travel of magnets 10. Device 24 is preferably uni-polar so that it remains actuated only when the magnetic field is perpendicular to the face of device 24.

In the absence of a magnetic field strength greater than the operative point threshold of Hall-effect device 24, the output of device 24 remains in a high voltage state. The output of the Hall-effect device switches to a low voltage state when the magnetic field strength exceeds the operative point threshold of the Hall-effect device. This occurs when magnets 10 on the brush assembly 23 reach a position adjacent to Hall-effect device 24. The low state output of Hall-effect device 24 indicates that brush 14 has worn to a particular percentage of its initial length.

Hall-effect device 24 is a 3-lead package (not shown): one lead is connected to a supply voltage (not shown); one lead is connected to the common (not shown); and one lead is connected to the output (not shown) of device 24. When magnetic flux is detected such that it exceeds the operative threshold of device 24, the output is turned ON and connects to common. A pull-up resistor is connected between the supply and the output. When the output is OFF (i.e., when a magnetic field is not detected), the potential is the same at the output and supply. When the output is ON (i.e., when a magnetic field is detected), the voltage at the output will equal the saturation voltage of the Hall-effect device. A low-voltage condition indicates that the brush 14 has worn to a percentage of initial length.

Figure 6:
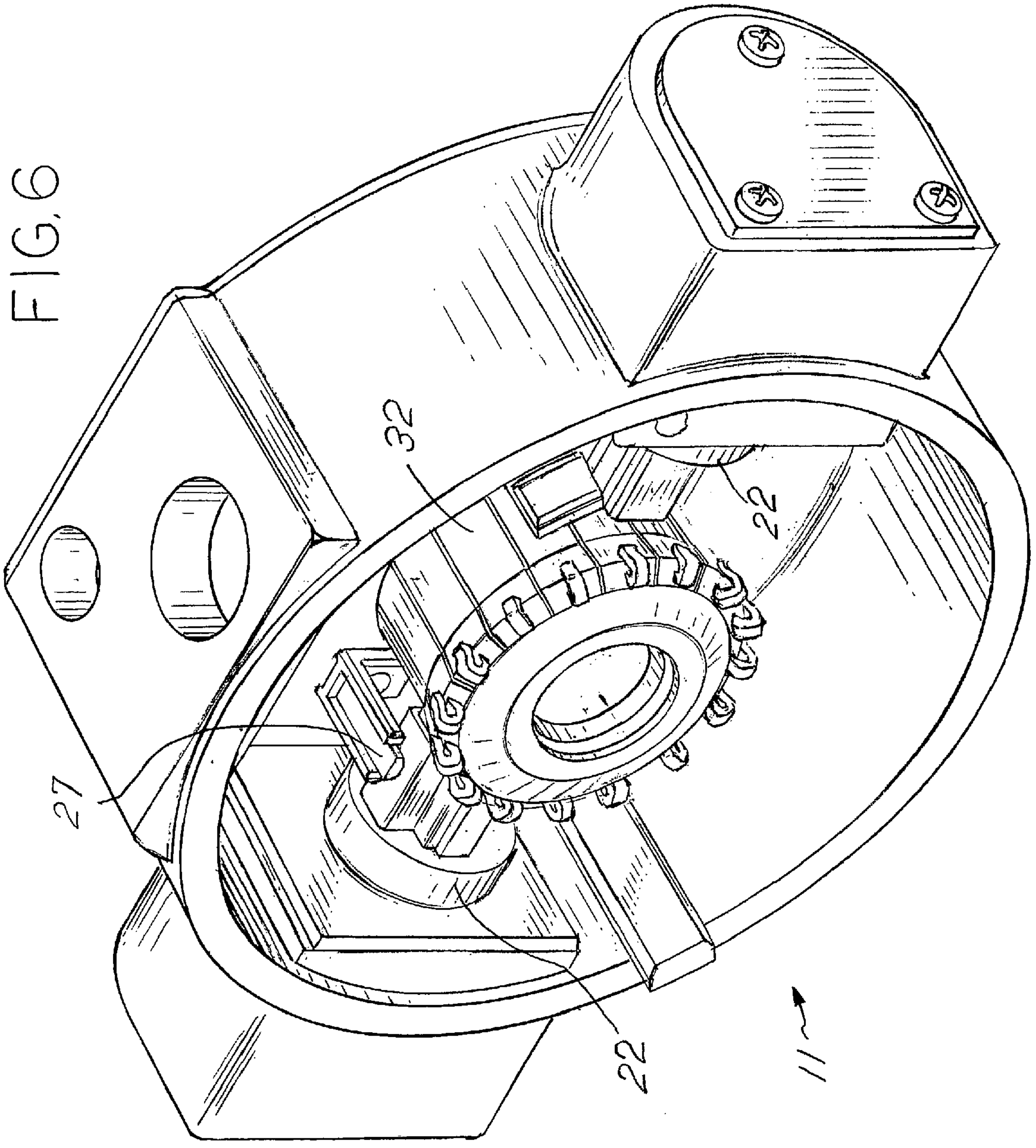
FIG. 6 is a perspective view of the electrical input end of the D.C. motor of FIG. 1.

A perspective view of the electrical input end of the D.C. motor 11 is illustrated in FIG. 6. The commutator 32 is shown relative to two brush assembly holders 22. Hall-effect device assembly 27 is shown positioned relative to one of the holders 22. As will suggest itself, another Hall-effect device assembly 27 (not shown) may be positioned relative to the other holder 22, if desired.

Figure 7:
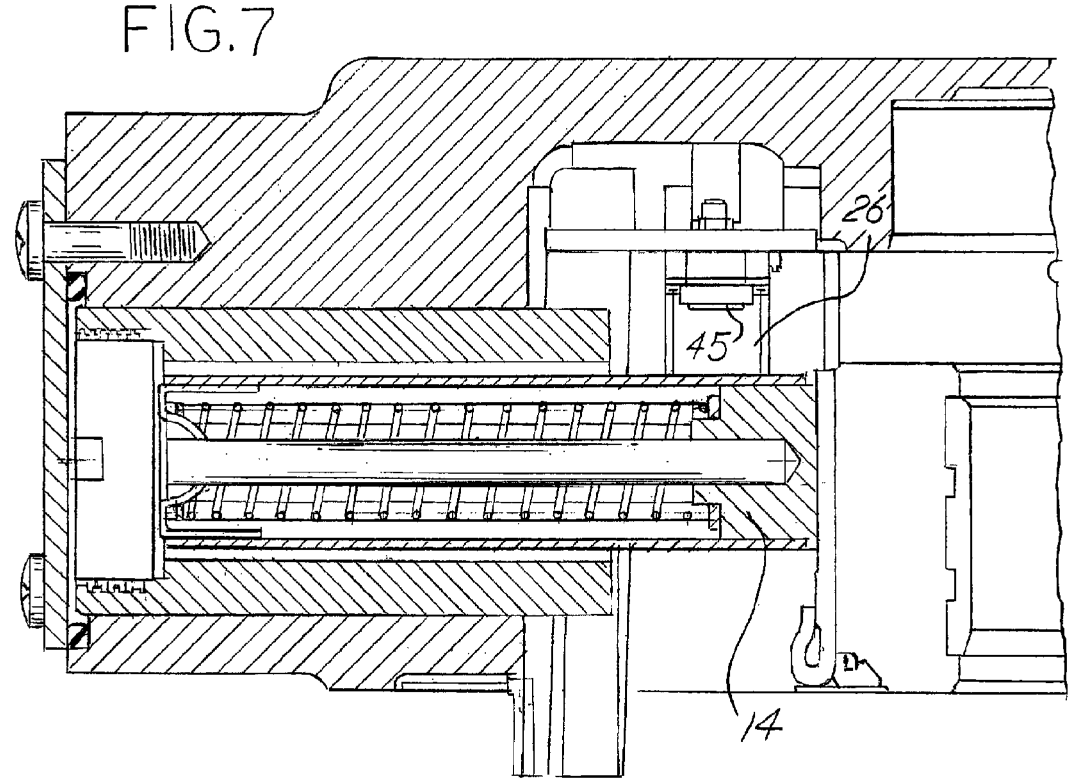
FIG. 7 is an enlarged cross-sectional lateral view of the brush assembly and holder of the apparatus of FIG. 1.

FIG. 7 illustrates an embodiment of the wear detector apparatus in which housing 26 is secured by a fastener 45 relative to brush 14, so as to position the Hall-effect device 24 (not shown in FIG. 7).

Figure 8:
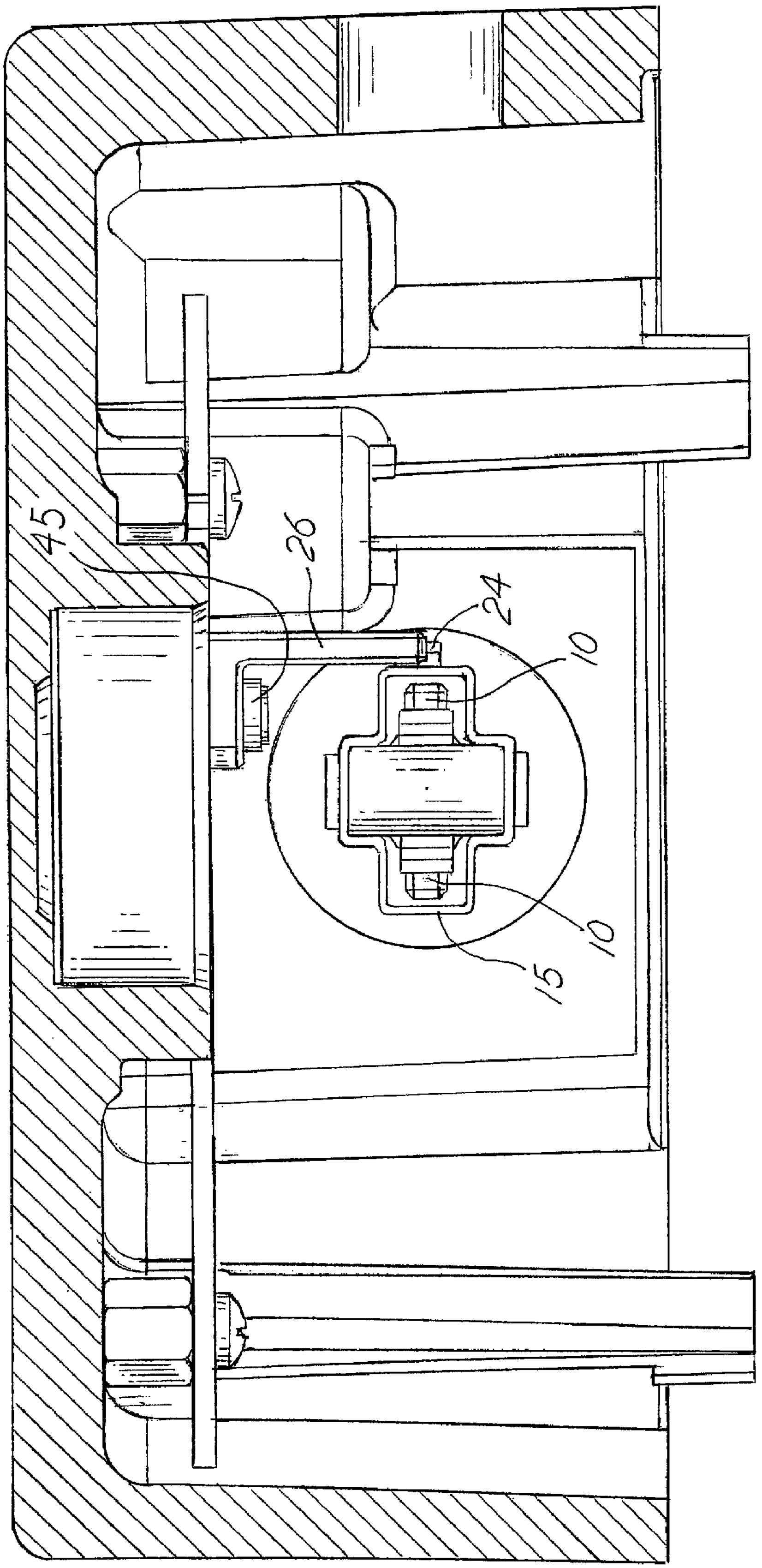
FIG. 8 is a cross-sectional end view of the brush assembly and holder, and view of the Hall-effect device, of that apparatus of FIG. 1.

FIG. 8 is a cross-sectional end view illustrating an embodiment of the wear detector apparatus in which two magnets 10 are illustrated relative to Hall-effect device 24. Magnets 10 are shown within the side channels of tube 15.

Figure 9:
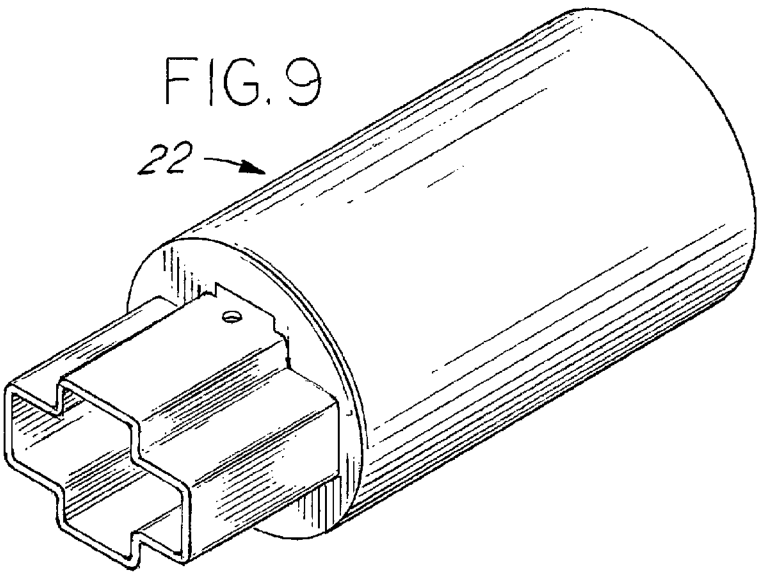
FIG. 9 is a perspective view of the brush assembly holder of the apparatus of FIG. 1.

FIG. 9 illustrates a perspective view of an embodiment of brush assembly holder 22.

While particular steps, elements, embodiments and applications of the present invention have been shown and described, it will be understood, of course, that the invention is not limited thereto since modifications can be made by persons skilled in the art, particularly in light of the foregoing teachings. It is therefore contemplated by the appended claims to cover such modifications as incorporate those steps or elements that come within the scope of the present invention.

We claim:

1. A brush wear detector for use in an electric actuating device having a brush which is held in contact with a commutator and which wears over time, said detector comprising:

a. a magnet associated with said brush and moveable as said brush wears, said magnet moveable to a selected worn brush position; and b. a sensor for detecting the field generated by said magnet, said sensor generating an electrical signal when said magnet moves into said worn brush position; and c. a brush holder having a relief channel adapted to enclose the path of movement of said magnet.

2. A brush wear detector of claim 1, and further including a brush assembly having a brush and a bracket, said bracket being attached to the distal end of said brush, and wherein said magnet being attached to said bracket; and a second magnet, said magnet and said second magnet being adhered on either side of said bracket.

3. The brush wear detector, for use in an electric actuating device having a brush and a commutator, said detector comprising:

a brush holder with an end proximate the commutator and an end distal the commutator;

a bracket mounted to the distal end of the brush;

a helical coil spring mounted within the brush holder and forces the proximate end of the brush in contact with the commutator as the brush is worn;

a permanent magnet mounted to said bracket that moves with said bracket as the brush wears, said magnet moving into a selected worn brush position; and a Hall-effect device detecting the field generated by said magnet and generating a signal when said magnet moves into said worn brush position; and wherein:

a. said magnet has a leading face and a trailing face along the path of movement of the magnet;

b. said brush holder has a relief channel adapted to enclose the path of movement of said magnet; and c. said bracket has an edge proximate the commutator, said edge being bent away from said brush and towards said leading edge of said magnet, said magnet being contained on all sides.

* * * * *